Aug. 7, 1956 K. A. KLINGLER 2,757,542
HYDRAULIC EXTENSIBLE SEAL
Filed Dec. 11, 1952 3 Sheets-Sheet 1

INVENTOR.
Karl A. Klingler
BY
Harvey M. Gillespie
Atty.

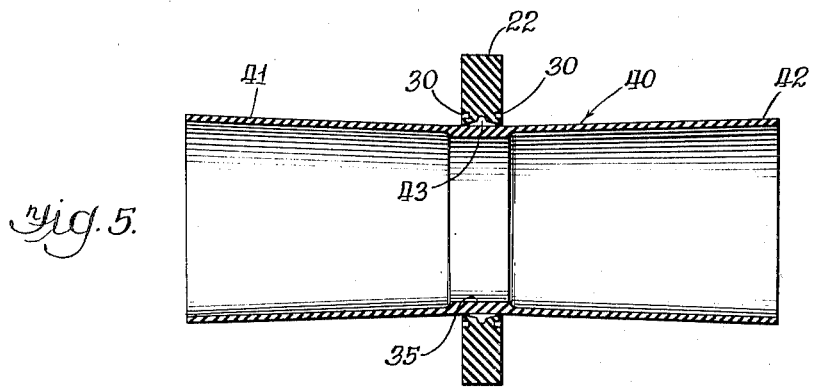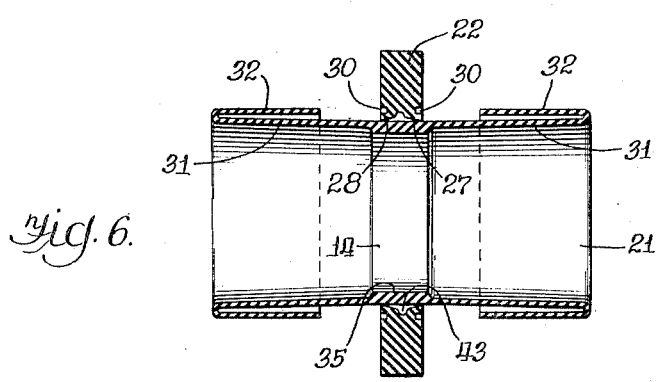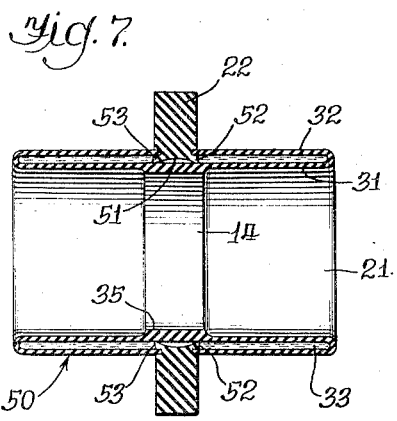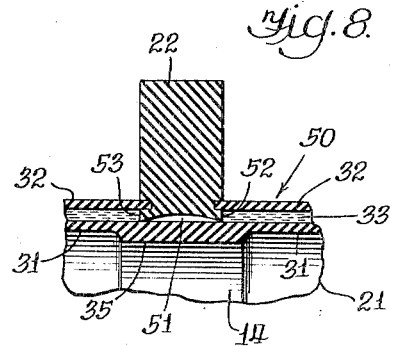

Aug. 7, 1956
K. A. KLINGLER
2,757,542
HYDRAULIC EXTENSIBLE SEAL
Filed Dec. 11, 1952
3 Sheets-Sheet 3
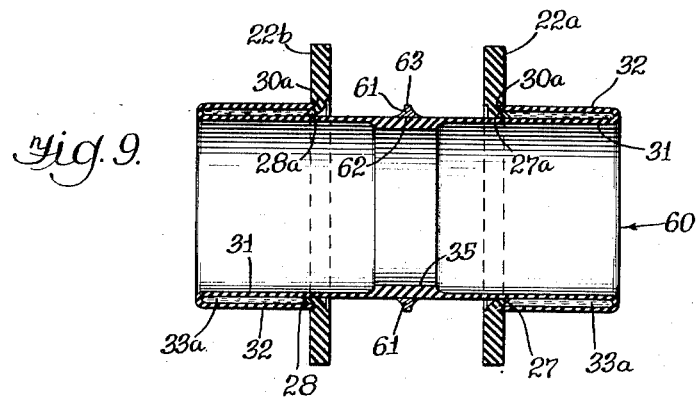
Fig. 9.
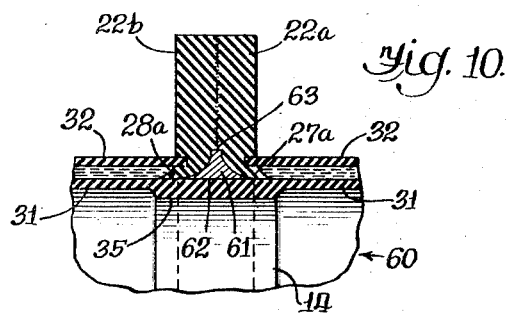
Fig. 10.
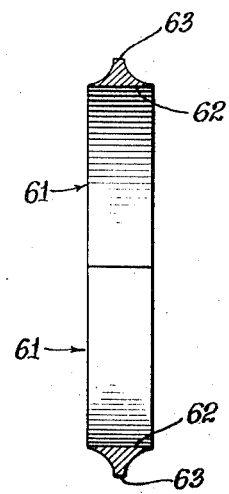
Fig. 12.
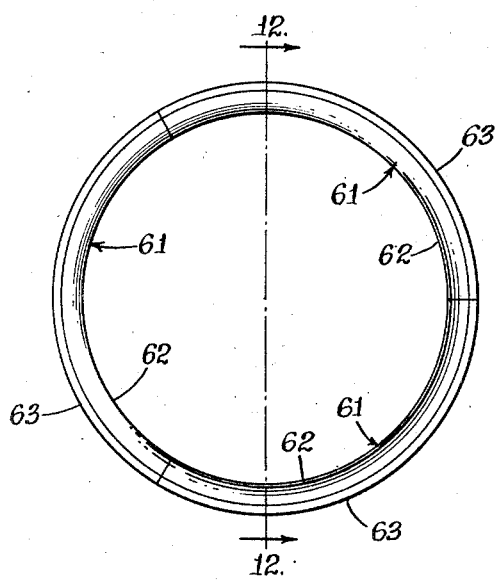
Fig. 11.
INVENTOR.
Karl A. Klingler
BY
Atty.

United States Patent Office 2,757,542
Patented Aug. 7, 1956

2,757,542

HYDRAULIC EXTENSIBLE SEAL

Karl A. Klingler, Naperville, Ill.

Application December 11, 1952, Serial No. 325,403

9 Claims. (Cl. 74—18.2)

The present invention relates to an improved hydraulic extensible seal which is particularly suitable for use in connection with a lengthwise movable rod or shaft.

Where resilient packing is employed in a sealing gland for reciprocable shafts, difficulty is frequently encountered at the outset from tightening of the gland with a consequent abrasion and wear of the reciprocating shaft. After a certain amount of such wear, the gland becomes loose and thereafter leakage sets in. Where lip type packing is concerned, there is additionally a tendency for the packing to seal against pressure in one direction only along the surfaces to be sealed. It is therefore among the principal objects of the present invention to provide an extensible seal which will provide an effective seal in both directions axially of a reciprocating shaft or rod and in which the dangers of either excessive tightening or loosening of the gland are avoided.

A similar and related object of the invention is to provide a shaft seal for reciprocating shafts which will seal the shaft against leakage of liquids or gases under either positive or suction pressures when applied between the shaft and a casing or other surrounding member, between which shaft and member there is relative reciprocal movement.

Another and general object of the invention is to provide a shaft seal for reciprocating shafts which has an extremely great sealing power against pressure or suction with a minimum of frictional resistance against any relatively movable parts.

Another object is to provide a shaft seal for relatively moving parts, for example a reciprocable shaft and the surrounding wall of a casing or other member through which the shaft extends, which will offer a comparatively wide area of contact both to the surface of the shaft and will provide a thoroughly sealed fixed engagement with the casing surrounding the shaft.

A further object is to provide such a shaft seal which will automatically compensate for any misalignment or side play between the relatively movable parts undergoing sealing without fluid leakage.

In carrying out the above mentioned objects and others yet to be enumerated, briefly, the invention contemplates the provision of a novel type of sealing element which operates upon hydraulic principles. Specifically, the sealing element is in the form of a double wall sleeve-like member which surrounds the shaft. The space between the inner and outer cylindrical walls of the sealing element contains a small quantity of a fluid such as oil to provide a film of lubricant to prevent friction between the said walls. The internal surface areas of the sealing member are comparatively large in extent to provide wide sealing areas to the shaft with substantial clearance between the sealing member and the casing surrounding the shaft or, as an alternative, to provide a wide sealing area to the wall of the surrounding casing elements with substantial clearance between the inner wall of the sealing member and the shaft. Seals of this character are capable of accommodating wide manufacturing tolerances in the parts undergoing sealing, and effective installations are made possible between a reciprocating plunger or shaft and an unmachined casing or between out-of-round parts within limits.

Other objects and advantages of the invention not at this time enumerated will become more readily apparent as the nature of the invention is better understood.

In the accompanying two sheets of drawings several illustrative embodiments of the invention have been shown.

In these drawings:

Fig. 5 is a fragmentary longitudinal sectional view taken centrally through a sleeve element and retainer employed in connection with the present invention and illustrating one step in the manufacture of the shaft seal of Fig. 1;

Fig. 6 is a sectional view similar to Fig. 5 illustrating a further step in the manufacture of the seal;

Fig. 7 is a sectional view taken substantially centrally and longitudinally through a slightly modified form of shaft seal constructed in accordance with the present invention;

Fig. 8 is an enlarged detail view of a portion of the shaft seal shown in Fig. 7;

Fig. 9 is a sectional view similar to Fig. 6, showing a further modified form of shaft seal;

Fig. 10 is an enlarged detail view of a portion of the shaft seal shown in Fig. 9, but with the separately formed gasket members bonded together.

Fig. 11 is a side view in elevation of a sectional ring forming a part of the structure shown in Fig. 10; and Fig. 12 is a sectional view taken on line 12—12 of Fig. 11.

Figure 1:
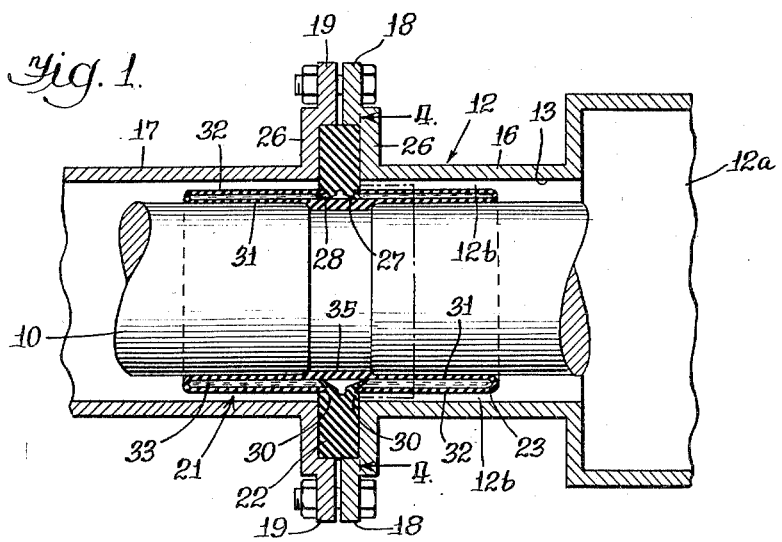
Fig. 1 is a fragmentary longitudinal sectional view taken substantially centrally through an extensible seal constructed in accordance with the principles of the present invention and showing the same in position between a casing section and a reciprocable shaft therein.
Figure 2:
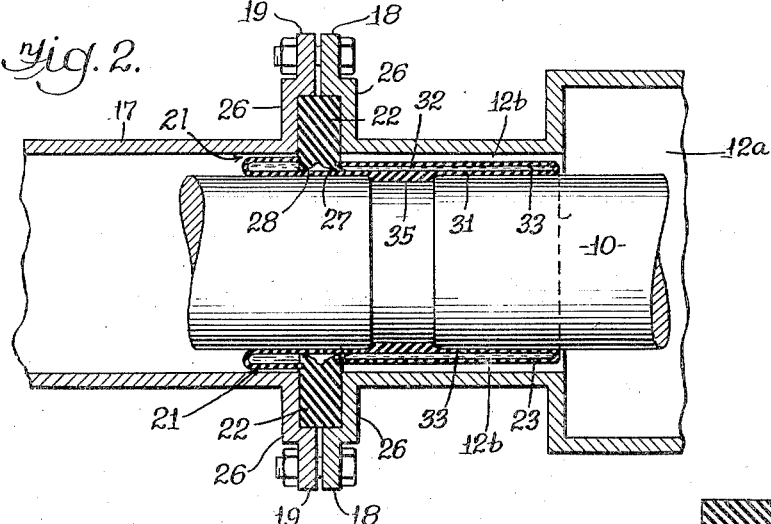
Fig. 2 is a sectional view similar to Fig. 1 showing the seal operatively applied to the relatively reciprocable parts with the parts in a predetermined positional relationship.
Figures 3, 4:
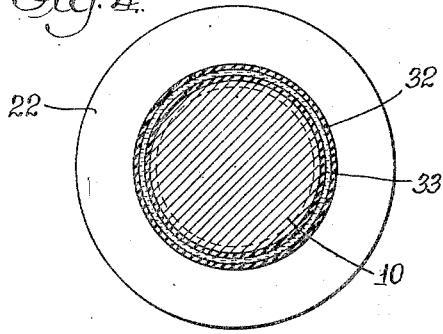
Fig. 3 is an enlarged fragmentary view of a portion of the extensible seal of Figs. 1 and 2.
Fig. 4 is a sectional view taken on the irregular line 4—4 of Fig. 1.

In the illustrative embodiment of the invention shown in Figs. 1 to 4 inclusive, the improved seal is disclosed as being applied to seal the space existing between a reciprocating shaft 10 and a casing assembly 12, the inner wall 13 of which is circular in cross section. The shaft 10 is formed with a shallow circumferential groove 15 which cooperates with the sealing device of the present invention in a manner that will become clear presently. The casing assembly 13, which has been fragmentarily shown, includes two adjacent casing sections 16 and 17 having end flanges 18 and 19 respectively bolted as at 20 to each other or otherwise secured together to join the two sections 16 and 17 in end-to-end communicating relationship.

The seal unit or assembly of the present invention is designated in its entirety at 21 and consists of two parts, namely a gasket member 22 and a sleeve member 21. Both members 22 and 21 cooperate to effectively seal the space existing between the shaft 10 and casing assembly 12, the gasket member being relatively thick and, in addition to serving as a gasket, functions as a support to maintain the shaft 10 and the seal member 21 centered for operation.

The gasket member 22 is in the form of a ring which may be formed of rubber, synthetic rubber or other elastomeric material. The two flanges of the casing assembly are formed with offset portions 26 between which the ring 22 is compressed when the clamping bolt assemblies 20 are tightened. The inner periphery of the ring member 22 is formed with a pair of oppositely facing, outwardly diverging annular lips 27 and 28 which are separated from the body of the ring by shallow grooves 30 (see particularly Fig. 3).

The sleeve member 21 is of double wall construction, which is to say that it is formed with an inner wall 31 and an outer wall 32 providing a cylindrical space or chamber 33 therebetween. As will become clear presently, the space 33 constitutes a hydraulic chamber designed to receive therein a small quantity of sealing fluid such as oil or the like to provide a lubricant film for supporting the walls 31 and 32 of the sleeve member spaced from each other sufficiently to prevent frictional contact.

The inner wall 31 of the sleeve member 21 is provided with a thickened band or rib 35 on the exterior surface of the wall, i. e. the interior surface of the sleeve member as a whole, and the cross-sectional configuration of the thickened portion is complementary to the cross-sectional shape of the groove 14 in the shaft 10 so that the rib 35 when received within the groove is slightly expanded and therefore provides a snug fit in the groove as shown in Fig. 1. The opposite face of the thickened portion presses firmly against the diverging lips 27 and 28.

The outer wall 32 is a continuation of the inner wall 31 or in other words the wall 31 is reversed upon itself to provide the wall 32, the latter of which is interrupted by the gasket member or ring 22 and the opposed interrupted ends of the wall 32 are received within the grooves 30 provided in the member 22. These opposed interrupted ends are preferably sealed to the ring member 22 by vulcanizing or the like. Before the wall 32 is sealed in the groove 14 a small quantity of liquid, preferably oil, is delivered into the turned back portion of the sleeve while the sleeve is held in a position to retain the said oil. There are other ways in which the space between the inner and outer walls 31, 32 may be partially filled with lubricant, for example by providing an oil duct through a portion of the gasket member 22. However, the quantity of oil is preferably such that the outer walls 32—32 at opposite sides of the gasket 22 will remain spaced from the walls of the casing. In such case the pressure of the gas or liquid within the pressure chamber 12$^a$ will enter the space 12$^b$ between the casing and the outer wall of the seal so as to exert pressure thereon to press the inner wall 31 tightly against the shaft. The lips 27 and 28 serve as walls to prevent the oil from being forced from the high pressure side of the seal into the lower pressure section at the opposite side of the gasket 22.

One manner of constructing the composite sealing assembly 21 is illustrated in Figs. 5 and 6. As shown, the sealing sleeve 21 is formed from a premolded tubular member 40 having a cylindrical wall which preferably flares outwardly in opposite directions as at 41 and 42 from the preformed internal annular thickened rib or band 35 previously mentioned. As shown in Fig. 5, the tubular member 40, which is of a suitable elastomeric flexible material such as rubber, is telescopically received within the central opening 43 provided in the gasket member or retainer ring 22 and the ring is centered on the tubular member 40 in radial alignment or register with the thickened rib 35.

Because of the fact that the wall of the tubular member 40 is flared in opposite directions as described above, reversal of the ends of the member to provide the outer and inner walls 32, 31 of the sealing sleeve 21 (Fig. 1) is facilitated. The ends of the flared portions 41 and 42 are brought into register with the grooves 30 in the ring 22 and are introduced into the grooves and thereafter these ends are vulcanized or otherwise secured in the grooves in sealing relation thereto to provide the completed sealing unit 21 shown in Fig. 1. The desired quantity of oil, as previously indicated, may be delivered into the channel formed by each turned back end of the sleeve before it is bonded to the ring 22.

The thus completed shaft seal element may be assembled in the sealing assembly of Fig. 1 by telescoping the seal element over the shaft 10 and thereafter bolting the casing sections 16 and 17 in position with the gasket member or ring 22 compressed therebetween and with the rib 35 nested within the annular groove 14 provided in the shaft 10.

From the above description it will be seen that in operation, as the shaft 10 reciprocates axially within the casing 12, the gasket member or ring 22 will be held substantially stationary while the thickened rib portion 35 of the inner sleeve wall 31 will reciprocate with the shaft. The net effect of this will be to cause a shifting movement of the sealing sleeve 23 as a whole by a rolling action of the turned back end portions of the sleeve. During such shifting of the sleeve, portions of the inner sleeve wall 31 near the opposite ends thereof will be rolled and transferred to the outer sleeve wall 32 and vice versa while the small quantities, for example films of hydraulic fluid between the walls at opposite sides of the gasket ring 22 will be retained in their respective chambers by reason of the lips 27 and 28 and the resilient pressure of the thickened portion 35 against the lips to provide a squeegee action which prevents oil passing the lips 27, 28. As pressure is built up within the sleeve by the shortening of the sleeve on one side of the ring member 22, for example on the left side thereof as viewed in Fig. 1, the lip 28 will be forced into sealing engagement with the wall 31 and the fluid within the space on the left side of the ring member 22 will remain effectively isolated from the fluid at the right side of said ring member. Inasmuch as a fluid such as oil is incompressible, the fluid entrapped on the left side of the lip 28 will tend to slightly expand the sleeve member on this side in response to a shortening of its length but such expansion is normally very slight since there is only a slight quantity of oil contained therein.

Referring now to Figs. 7 and 8, the sealing unit 50 illustrated therein is similar in many respects to that shown at 21 in Figs. 1 to 4 inclusive and its mode of construction and its assembly in a packing gland is also similar. For this reason it is deemed unnecessary to resort to a detailed description thereof and the application of similar reference numerals to the corresponding parts will suffice for partial descriptive purposes. In this form of the invention, the gasket member or retainer ring 22 receives the opposed interrupted ends of the outer sleeve wall 32 within the grooves 30, as heretofore, but the lips 27 and 28 on this member have been dispensed with and the inner edge of the retainer ring 22 is slightly concave as shown at 51 so as to provide two lips 52 and 53 which are somewhat blunt and are therefore less flexible than the lips 27 and 28 in the form of seal shown in Figs. 1 to 4 inclusive. Otherwise the sealing unit, together with its thickened rib 35 and other parts remains substantially the same.

In Figs. 9, 10 and 11, a further modified form of sealing assembly is illustrated. The sealing unit 60 is substantially identical with the sealing unit of Figs. 1 to 4 inclusive when the unit is completely constructed, except that a sectional metallic ring 61 is positioned to encircle the sleeve 21 at a location to provide a rigid backing for the annular lips designated 27$^a$—28$^a$. The ring 61 is formed in three 120° segments. Each segment provides a cylindrical inner surface 62 and a radially outwardly tapered outer surface 63. The insert is adapted to be positioned within the space existing between the sleeve walls 31 and 32 with the outwardly tapered surface thereof positioned between the lips 27$^a$ and 28$^a$ so as to substantially fill the void existing between these lips. The cylindrical inner surface 62 of the sectional insert is adapted to slide on the inner surface of the inner sleeve wall 31 when the shaft is reciprocated relative to the surrounding casing wall. The insert 61 is made in three sections in order to facilitate or enable assembly of the sealing unit over the shaft with which it is associated. After such assembly the ends of three ring sections will move into close relation with each other.

While the completed structure of Figs. 9 and 10 is similar to the previous forms illustrated, it is made preferably splitting the gasket 22 to provide two sections designated 22ª, 22ᵇ, each of which is formed with the circular slots 30ª—30ª adapted to receive the back turned ends of the outer walls 32 of the sleeve. After the separate gaskets 22ª—22ᵇ are attached to the sleeve 60 and a suitable quantity of hydraulic fluid is introduced in the hydraulic chamber 33ª, the gaskets 22ª, 22ᵇ are vulcanized or otherwise suitably bonded together along the line 64 (Fig. 10) to form a single gasket. This manner of construction may be followed either with or without the metal ring 61.

The operation of the sealing unit 60 in a packing gland is substantially the same as the operation of the sealing unit 21 but in the case of the unit 60 the gasket portion of the seal is rigidified by the presence of the insert 61.

While the invention has been illustrated in connection with certain preferred embodiments it will be understood that further modifications might be made without departing from the spirit of the invention. For example, the position of the gasket 22 and the thickened portion may be reversed, whereby the gas will extend inwardly from the inner wall and the thickened portion 35 may be positioned on the outer wall of the sleeve. Therefore, the invention is to be limited only insofar as express limitations are contained in the accompanying claims.

I claim:

1. A seal assembly comprising an elongated tubular sleeve adapted to seal a space between inner and outer relatively reciprocable elements; said sleeve being formed of an elastomeric material and having its opposite ends folded upon itself to provide inner and outer walls, an annular member encircling the medial portion of the inner wall and secured to the outer wall to provide a partition separating the space between said walls into inner and outer chambers for containing a non-compressible fluid for supporting the walls of the sleeve in spaced relationship, the ends of the walls being free to shift longitudinally by a rolling of increments of one wall into the other, the inner perimeter of said partition being formed with compressible lip portions for restraining shifting of the fluid from one chamber to the other and one of said walls of the sleeve being normally spaced from one of said relatively reciprocable elements, whereby pressure entering the last mentioned space presses the other wall of the sleeve tightly against the other relatively reciprocable elements.

2. A seal assembly comprising an elongated tubular sleeve adapted to seal a space between inner and outer relatively reciprocable elements; said sleeve being formed of an elastomeric material and having its opposite ends folded upon itself to provide inner and outer walls, an annular member encircling the medial portion of the inner wall and secured to the outer wall to provide a partition separating the space between said walls into inner and outer chambers for containing a non-compressible fluid for supporting the walls of the sleeve in spaced relationship, the ends of the walls being free to shift longitudinally by a rolling of increments of one wall into the other, the inner perimeter of said partition being formed with spaced apart diverging compressible lip portions for restraining shifting of the fluid from one chamber to the other and one of said walls of the sleeve being normally spaced from one of said relatively reciprocable elements, whereby pressure entering the last mentioned space presses the other wall of the sleeve tightly against the other relatively reciprocable elements.

3. A seal assembly comprising an elongated tubular sleeve adapted to seal a space between inner and outer relatively reciprocable elements; said sleeve being formed of an elastomeric material and having its opposite ends folded upon itself to provide inner and outer walls, an annular member encircling the medial portion of the inner wall and secured to the outer wall to provide a partition separating the space between said walls into inner and outer chambers for containing a non-compressible fluid for supporting the walls of the sleeve in spaced relationship, the ends of the walls being free to shift longitudinally by a rolling of increments of one wall into the other, the inner perimeter of said partition being formed with spaced apart diverging compressible lip portions for restraining shifting of the fluid from one chamber to the other, a segmental rigidifying ring inserted in the space between said lips and means projecting from the outer and inner walls to facilitate attachment thereof to the elements to be sealed and one of said walls of the sleeve being normally spaced from one of said relatively reciprocable elements, whereby pressure entering the last mentioned space presses the other wall of the sleeve tightly against the other relatively reciprocable elements.

4. The combination with a stationary cylindrical casing and a shaft reciprocable therein, said shaft being formed with an annular groove, said casing being provided with opposed mating attachment flanges providing a gasket space therebetween, of a sealing unit for sealing the space existing between the shaft and casing, said sealing unit comprising an elongated tubular sleeve member formed of an elastomeric material surrounding the shaft within said space, said sleeve member having a hollow wall including inner and outer wall sections, an incompressible fluid disposed within said hollow wall, the outer wall section having a radially extending hub providing a gasket member extending into said gasket space, the inner wall section having a radially extending thickened portion extending into said annular groove in the shaft, and an incompressible fluid in said hollow sleeve wall and serving to support said wall sections in spaced relation to the presence of pressure thereon and one of said wall sections of said sealing unit being normally spaced from the wall of said casing, whereby pressure entering the last mentioned space presses the other wall of said sealing unit tightly against said shaft.

5. The combination claimed in claim 4 in which said radially extending gasket-forming hub projects inwardly through the outer wall section and sealingly bears against the inner face of the inner wall sections to restrict axial shifting of the fluid contained within said hollow wall.

6. The combination claimed in claim 4 in which said radially extending gasket-forming hub projects inwardly through the outer wall section and is formed with an internal annular concavity providing a pair of circular edge regions adapted to slidingly engage the inner wall section to restrict the flow of fluid axially within the hollow wall.

7. The combination claimed in claim 6 characterized in that the said gasket-forming hub includes separate gasket elements having their adjacent faces bonded together.

8. The combination with a stationary cylindrical casing and a shaft reciprocable therein, said casing being formed with an internal gasket-receiving space, of a sealing unit for sealing the space between said shaft and casing, said sealing unit comprising an elongated tubular sleeve member formed of an elastomeric material surrounding the shaft within said space, said sleeve member having a hollow wall including inner and outer wall sections with the outer wall normally spaced from said casing, an incompressible fluid disposed within said hollow wall, the outer wall section having a radially extending hub extending into said gasket space, said gasket-forming hub projecting through the outer wall section and being formed with a pair of annular diverging lips on its inner periphery designed for sealing engagement with the inner face of the inner wall section.

9. The combination set forth in claim 8 and in addition an expansible ring member disposed within said hollow wall and having its inner periphery bearing against the inner face of said inner wall section and having its outer surface extending into and substantially filling the space existing between said diverging lips.

References Cited in the file of this patent

FOREIGN PATENTS

| | | |
|---|---|---|
| 118,901 | Switzerland | Feb. 16, 1927 |
| 324,518 | France | Dec. 13, 1902 |
| 456,103 | Germany | Feb. 16, 1928 |